United States Patent [19]
Glodis et al.

[11] Patent Number: 5,044,724
[45] Date of Patent: Sep. 3, 1991

[54] METHOD OF PRODUCING OPTICAL FIBER, AND FIBER PRODUCED BY THE METHOD

[75] Inventors: Paul F. Glodis, Atlanta, Ga.; Kenneth L. Walker, New Providence, N.J.

[73] Assignee: AT&T Bell Laboratories, Murray Hill, N.J.

[21] Appl. No.: 456,880

[22] Filed: Dec. 22, 1989

[51] Int. Cl.$^5$ ............................................... G02B 6/22
[52] U.S. Cl. ........................................ 385/127; 385/141
[58] Field of Search ............... 350/96.29, 96.30, 96.33, 350/96.34

[56] References Cited

U.S. PATENT DOCUMENTS

| | | | |
|---|---|---|---|
| 4,447,127 | 5/1984 | Cohen et al. | 350/96.33 |
| 4,641,917 | 2/1987 | Glodis et al. | 350/96.33 |
| 4,691,990 | 9/1987 | Cohen et al. | 350/96.33 |
| 4,767,429 | 8/1988 | Fleming et al. | 65/3.11 |
| 4,770,492 | 9/1988 | Levin et al. | 350/96.29 |
| 4,802,733 | 2/1989 | Bachmann et al. | 350/96.34 |
| 4,852,968 | 8/1989 | Reed | 350/96.33 |

Primary Examiner—Frank Gonzalez
Attorney, Agent, or Firm—E. E. Pacher

[57] ABSTRACT

The inventive method of producing optical fiber comprises producing a rod-like silica-based body, overcladding the body with pre-existing silica-based glass, and drawing fiber from the thus produced preform. The rod-like body comprises a core and a first cladding that surrounds the core, both consisting of deposited glass, and further comprises a second cladding that surrounds the first cladding and that is derived from a substrate tube that has a refractive index $n_2 < n_0$, the refractive index of vitreous silica. The overcladding comprises pre-existing glass, and comprises a third cladding region that has a refractive index $n_3 \leq n_0$. Typically, the overcladding material is derived from one or more overcladding tubes. The inventive method can be used to produce preforms capable of yielding more fiber than prior art rod-in-tube preforms, potentially resulting in significant cost reduction without performance penalties. A variety of advantageous embodiments of the inventive methods, as well as of fiber produced by the method, are disclosed.

11 Claims, 2 Drawing Sheets

METHOD OF PRODUCING OPTICAL FIBER, AND FIBER PRODUCED BY THE METHOD

FIELD OF THE INVENTION

This invention pertains to the field of optical fiber.

BACKGROUND OF THE INVENTION

Optical fiber for long-haul communications has reached a remarkable state of perfection. For instance, single mode fibers having loss of about 0.20 db/km are rountinely being produced. Nevertheless, there is still great interest in further reducing the signal loss, since even a reduction as small as 0.01 db/km can translate into a significant increase in the permitted distance between repeaters. This in turn can translate into a significant difference in system cost, especially for transmission systems such as transoceanic fiber optic systems that, by necessity, have to employ highly complex (and thus costly) repeaters.

A related aspect is the need to reduce system cost through reduction of fiber cost. For instance, if the length of fiber drawn from a preform can be increased substantially, without proportional increase in the cost of producing the preform, then a substantial reduction in fiber cost will generally result.

As is well known, the optically active part of an optical fiber (i.e., the core and the surrounding "deposited" cladding) generally consists of glass that is synthesized in a glass-forming reaction and deposited on a substrate. See, for instance, U.S. Pat. No. 4,691,990, which is incorporated herein by reference.

There are currently two categories of methods for producing the optically active portion of optical fiber in commercial use. One category comprises the so-called outside processes (OVD and VAD), and the other the so-called "inside" processes (MCVD and PCVD). This application pertains primarily to the fiber produced by the latter processes, although the invention can also be practiced with at least some variants of outside processes.

As is well known, in the inside processes the glass-forming reaction is caused to take place inside a silica-based tube (generally referred to as the "substrate" tube) and the resulting glassy reaction product is caused to be deposited on the inside wall of the substrate tube.

A major component of the cost of producing optical fiber is the cost of depositing the core and deposited cladding material, collectively to be referred to as the "deposited" glass. Thus, it would be desirable to be able to draw more fiber from a given preform without, at the same time, proportionately increasing the deposition time.

Artisans know some methods that can be used to decrease the percentage of deposited glass in a fiber, without incurring a substantial loss penalty. The discussion will be in terms of a widely used, commercially available single mode fiber design which is schematically shown in FIG. 1.

The inner portion of the fiber (consisting of in situ-produced deposited silica-based glass) consists of core 10 (effective refractive index $n_c$, effective diameter d), surrounded by first cladding region 11 (effective refractive index $n_1$, effective outer diameter D). Typically, $n_c > n_o$, and $n_1 < n_o$, where $n_o$ is the refractive index of nominally pure vitreous silica. As will be readily appreciated, refractive indices are compared at a given wavelength, e.g., the intended operating wavelength of the fiber.

FIG. 1 also shows second cladding region 12 (outer diameter $D_o$, refractive index $n_2 = n_o$) that generally consists of glass derived from the substrate tube and that surrounds the inner portion of the fiber. Typically, for low loss fibers D/d has to be at least about 5, due in part to the relatively high loss of available silica glass tubes but, typically more importantly, due to unacceptably high macrobending losses that could occur (for designs having relative large index differences) for $D/d \lesssim 5.0$. It is to be noted that macrobending losses can occur due to the existence of the index step between the first and second cladding regions, and could occur even if the material of the second cladding region had very low loss. The fiber diameter ($D_o$) is such that $D_o/d$ is about 15, D/d is between about 5.5 and about 6.5, resulting in a fiber in which typically about 19% of the total volume is deposited glass.

More fiber per preform could be obtained if more glass were deposited and a thicker substrate tube were used. However, this generally is not feasible when an inside deposition process is used, since a thick substrate tube typically would have too much thermal impedance and make it difficult to sustain the glass-forming reaction inside the tube with a conventional outside heat source and to subsequently collapse the tube to a rod. Furthermore, the time required for deposition would increase, limiting any potential improvement in economics.

In order to overcome this limitation it has been proposed that an appropriately scaled-up amount of deposited glass be synthesized inside a standard silica tube, the tube be collapsed, and the thus produced rod-like glass body be overclad by shrinking a silica tube around the body. Exemplarily, for D/d of 5.5 and $D_o/d$ of about 15, in the so-called "rod-in-tube" process about 13% of the total fiber would be deposited glass, 40% would be derived from the substrate tube, and about 47% from the overclad tube. If a constant value of D/d is maintained by an increase in the amount of material deposited onto the substrate tube, the use of an overclad (as in the rod-in-tube process, or produced by any other overcladding technique) generally does not materially reduce the percentage of deposited glass in a fiber. However, it can lead to somewhat reduced fiber costs due to decreased set-up time per unit length of fiber, and has the benefits associated with longer continuous lengths of fiber from a larger preform, including the possibility of using higher draw speeds.

The above cited '990 patent discloses an approach that can be used to reduce the percentage of deposited glass in a silica-based fiber. FIG. 2 schematically depicts an exemplary index profile of fiber according to the '990 patent, wherein $n_2 < n_o$ (typically $n_2 \sim n_1$). Due to favorable macro-bending characteristics of such a fiber design, it is possible to reduce D/d to a value below the 5.5–6.5 range without incurring significant loss penalties. If the material of the second cladding region (12) has relatively low loss, it is possible to reduce D/d to about 3. Low loss down-doped silica tubes are becoming available now. Exemplarily, for D/d = 3 and $D_o/d = 15$, only 4% of the fiber would be deposited glass, the remainder being tube-derived glass. However, the design typically would not have all the propagation advantages of the depressed cladding design of FIG. 1, and would require low draw speeds to minimize the stress in the core.

In view of the commercial significance of improved methods of optical fiber manufacture, a method that can increase the amount of fiber that can be drawn from a preform, and/or that can result in fiber having lower loss, would be of great interest. This application discloses such a method, as well as the novel optical fibers produced by the inventive method.

SUMMARY OF THE INVENTION

In a broad aspect the invention is a method of making optical fiber that can result in improved (including lower cost) fiber, and novel fibers produced by the method.

More particularly, the inventive method comprises making a rod-like silica-based (typically more than about 80% b.w. silica) body, overcladding the body with pre-existing silica-based glass, and drawing fiber from the thus produced preform.

The rod-like body comprises an inner portion that consists essentially of silica-based glass that is produced in situ by means of a glass-forming reaction. The inner portion comprises a core region having a relatively large (relative to $n_1$) effective refractive index $n_c$ and an effective diameter d. The core index typically is greater than or approximately equal to $n_o$ ($n_c \gtrsim n_o$), where "approximately equal to" is intended to include the case of $n_c$ slightly less than $n_o$, due to down-doping of the core. In general, herein we mean that a first refractive index is approximately (or substantially) equal to a second refractive index if the normalized difference between the two indices is less than about 0.04%.

The inner portion further comprises a first cladding region that contactingly surrounds the core region and has an effective refractive index $n_1$ and an effective outer diameter D, with $n_1 < n_o$.

The rod-like body further comprises a second cladding region, of outer diameter D' and having a refractive index $n_2 < n_o$ (advantageously $n_2$ is equal to, or approximately equal to, $n_1$; the absolute value of $(n_2 - n_1)/n_2$ advantageously is less than about 0.04%). The second cladding region contactingly surrounds the inner portion and consists essentially of pre-existing silica-based glass, typically being derived from a F-doped silica substrate tube. The doping of the tube advantageously is such that $$\frac{n_o - n_2}{n_o} \gtrsim 0.03\%.$$

The overcladding material contactingly surrounds the rod-like body, has an outer diameter $D_o$, and comprises a third cladding region that has a refractive index $n_3 \leq n_o$, with $n_2 \leq n_3$. Typically, $n_2 < n_3$.

Typically at least a portion of the overcladding is derived from one or more silica-based overcladding tubes that is (are) collapsed onto the rod-like body. Optionally, all or part of the overcladding material can be formed by adhering pre-existing glass particles to the rod-like body, or to overcladding material that was previously collapsed around the body, such that a dense glass layer results.

Optical fiber according to the invention thus comprises a cladding region (the second cladding region) that is derived from a downdoped substrate tube, and further comprises overcladding material that surrounds the second cladding region and is derived from pre-existing glass, exemplarily a silica glass tube. At least a part of the overcladding material has a refractive index that is less than or essentially equal to that of pure silica glass. Such fiber can offer significant advantages, including significantly lower cost, as compared to prior art fiber, including prior art fiber produced by the known rod-in-tube process. Typically, in fiber according to the invention D/d is less than 5, typically in the range 2–4, and D'/d typically is in the range 4–10 (with D' > D).

BRIEF DESCRIPTION OF THE DRAWINGS

Analogous features in different figures are identified by like numerals. No attempt has been made to depict true size or proportions.

Detailed Description of Some Exemplary Embodiments

The description of the inventive method will be generally in terms of a silica-based rod-like glass body produced conventionally by MCVD. However, the inventive method is not so limited. For instance, the method can be readily practiced with bodies produced by a method that comprises another inside deposition process (e.g., PCVD), or an outside deposition process (e.g., VAD or OVD), provided only that the body consists of deposited glass that is surrounded by down-doped pre-existing glass.

Figure 1:
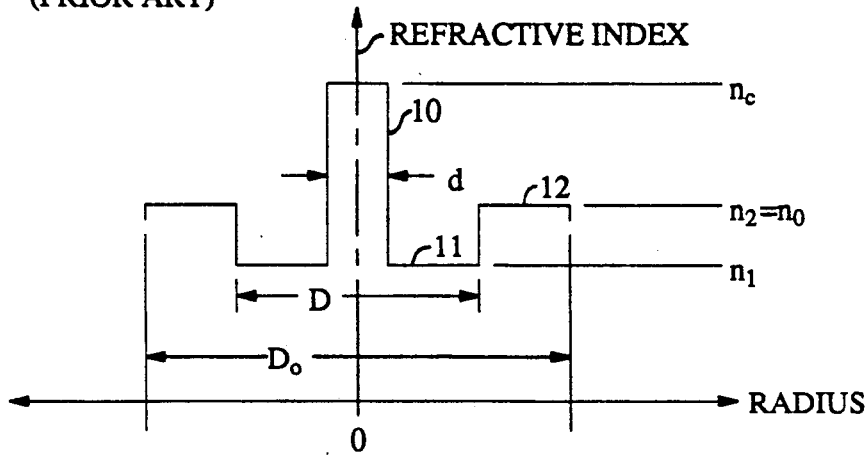
FIGS. 1 and 2 schematically depict prior art optical fiber refractive index profiles.
Figure 2:
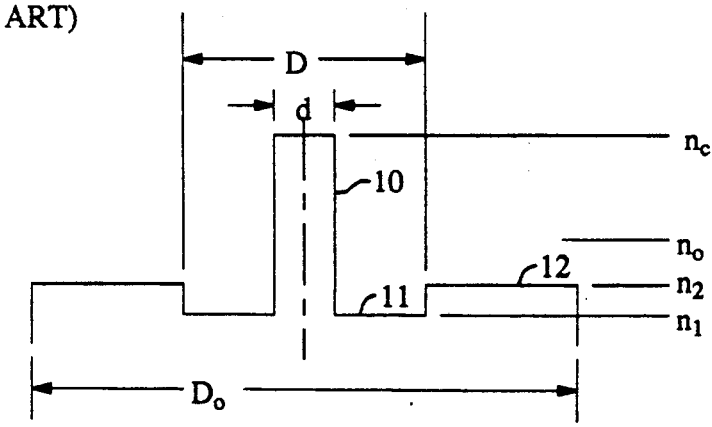
Figure 3:
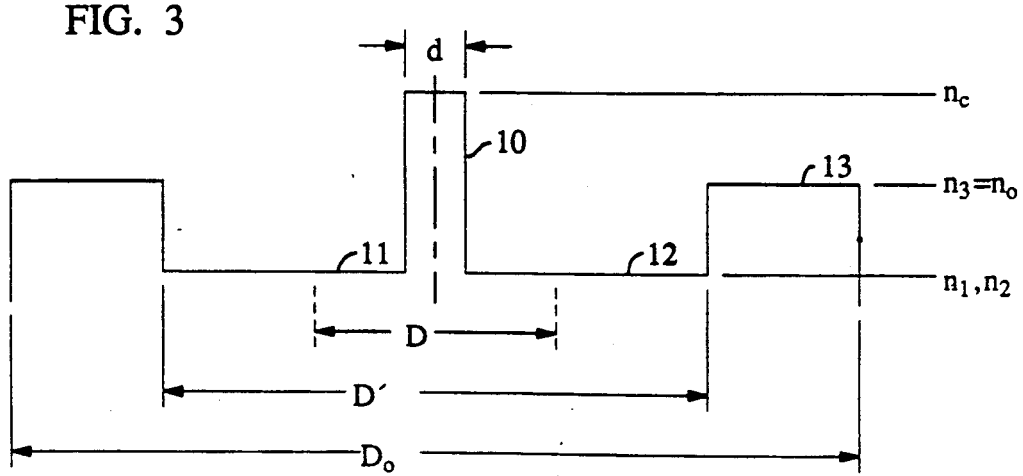
FIGS. 3–6 schematically show exemplary refractive index profiles of fiber according to the invention.

FIG. 3 schematically depicts the refractive index profile of an exemplary fiber according to the invention. Core 10 and first cladding 11 consist of deposited silica-based glass and are surrounded by second cladding 12. The second cladding in turn is contactingly surrounded by third cladding 13 (outer diameter $D_o$; refractive index $n_3$ exemplarily, but not necessarily, equal to $n_o$). In order to avoid significant macrobending losses, D'/d typically is about 5.0 or larger. Exemplarily, if D/d = 2.7 and $D_o/d = 15$, only about 3% of the fiber is deposited glass, about 8% is down-doped second cladding material, the remainder being overcladding material.

Exemplarily, the invention is embodied in optical fiber whose core and first cladding material is produced by an inside deposition process (e.g., MCVD), whose second cladding is derived from the substrate tube, and the overcladding is derived from one or more overcladding tubes, with the normalized refractive index difference between $n_2$ and the refractive index of at least one of the overcladding tubes being at least about 0.04% in magnitude. D/d of the fiber is less than 5. The overcladding of the exemplary fiber typically comprises a third cladding region having refractive index $n_3$, with the indices selected such that $n_c > n_1$ and $n_2$, $n_c \gtrsim n_o$, $n_o > n_1$ and $n_2$, $n_1 \sim n_2$, and $n_3 \leq n_o$. Furthermore, $(n_3 - n_2)/n_2 > 0.04\%$. Typically, the substrate tube is a F-doped synthetic silica tube. If the overcladding is derived from a single overcladding tube, then the overcladding tube typically is an undoped silica tube. If, on the other hand, the overcladding is derived from a multiplicity of overcladding tubes, then typically at least one of the overcladding tubes is a F-doped silica tube.

Fiber according to the invention, exemplified by the fiber of FIG. 3, can be produced as follows. A rod-like glass body that comprises the core and first and second cladding regions is produced in conventional fashion.

The second cladding material typically is derived from a down-doped silica tube, preferably a tube consisting of F-doped synthetic silica (by "synthetic" silica we mean vitreous silica that is produced by reacting precursor compounds, e.g., $SiCl_4$ and $O_2$. The reaction exemplarily is a high temperature gas phase reaction or a sol/gel-type reaction). The rod-like glass body is overclad with silica-based overcladding material, typically a silica tube, although overcladding by high temperature deposition of silica particles (exemplarily substantially in the manner disclosed in U.S. Pat. No. 4,767,429) is also contemplated. Fiber can be drawn in conventional manner from the thus produced preform.

The inventive method (exemplarily applied to a fiber design in which $D'/d$ is required to be greater than a certain value, e.g., 5) can be readily used to produce relatively massive preforms that can yield substantially more fiber than prior art preforms, including prior art overclad preforms. For instance, using conventional MCVD deposition lathes, it is possible to produce preforms that can yield more than 3 and even 5 times the length of fiber typically yielded by analogous prior art overclad preforms.

Figure 4:
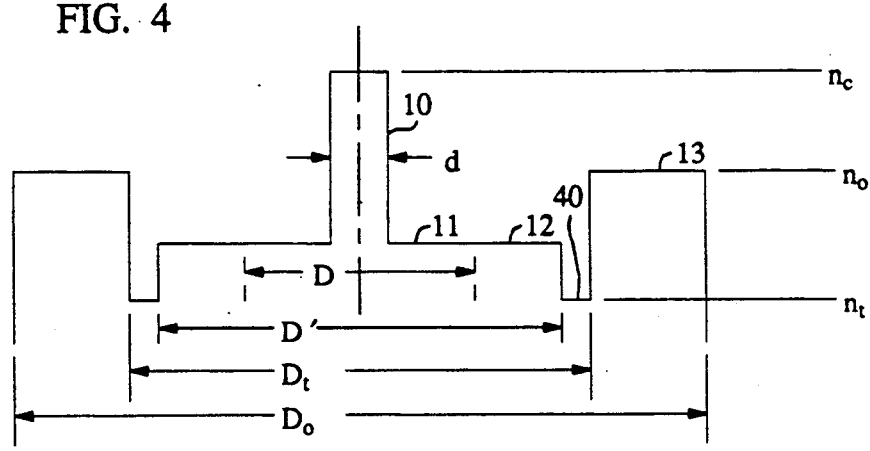

The invention can be embodied in a variety of fiber designs. An exemplary profile is shown in FIG. 4, wherein region 40 is a refractive index "trench" of the type disclosed in U.S. Pat. No. 4,852,968. As discussed in that patent, such a trench can be advantageously used to tune one or more of the fiber characteristics. A preform of the type shown in FIG. 4 can be produced by any appropriate variation of the basic inventive method. For instance, the rod-like body can be overclad first with "trench" material (e.g., by shrinking a thin-walled, heavily F-doped silica tube around the body, or by depositing F-doped silica onto the body), followed by overcladding of the body with the material of third cladding region 13.

A refractive index trench could also be produced by use of a down-doped substrate tube which comprises a more heavily down-doped region. A silica-based tube having radially non-uniform refractive index profile can be produced by forming a synthetic annular cylinder having a radially non-uniform profile, and drawing tubes from the cylinder in a known manner or, preferably, by forming an intermediate down-doped silica annular cylinder having a uniform refractive index, and shrinking a more heavily down-doped silica annular cylinder onto the intermediate cylinder.

Of course, the trench need not be positioned between 12 and 13 but instead can be positioned wherever desired. For instance, a trench could be placed between 11 and 12, exemplarily by starting the glass deposition with heavily F-doped material, followed by less heavily F-doped first cladding material. The placement of a trench between 11 and 12 can result in improved confinement of the guided radiation to the core and the first cladding region, whereby fiber loss can be reduced.

As is well known, it is advantageous to provide a relatively lightly doped (or even undoped) core, since such a core typically has lower optical attenuation. However, prior art fibers with such a core are difficult to produce, due to the relatively high viscosity of the core region at the draw temperature, and the typically low viscosity of the heavily down-doped cladding material. Because of the difference in viscosity at the draw temperature between core and cladding material, a large portion of the draw load has to be sustained by the very thin core region, requiring use of a relatively high draw temperature and/or low draw speed. It is also known that, at least for Ge-doped silica, high temperature process steps seem to be associated with some added loss, as compared to such material processed at lower temperature.

Figure 5:
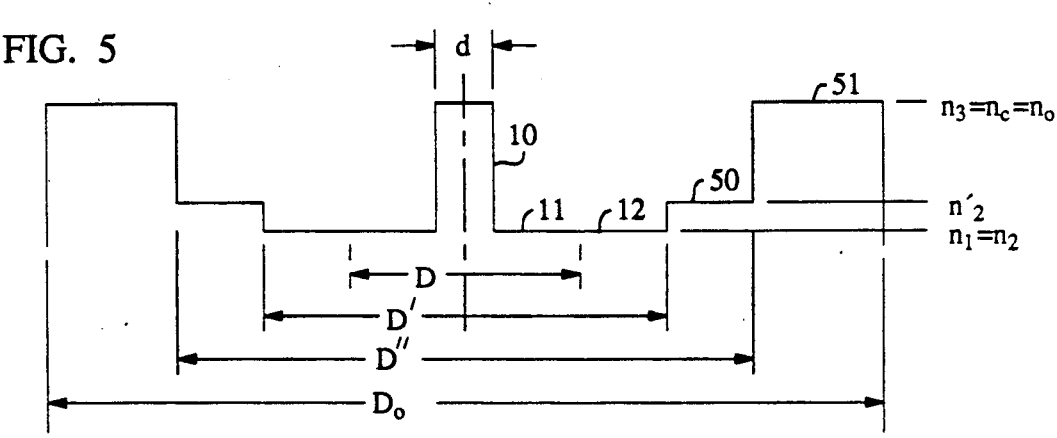

The above described problem can be overcome by fiber according to the invention, and FIG. 5 schematically shows the refractive index profile of an exemplary fiber that can accomplish this. The effective core index $n_c$ is approximately equal to $n_o$. The second cladding region 12 is surrounded by an additional down-doped cladding region 50 which in turn is surrounded by an undoped region 51. Exemplarily, $D/d$ is 2.7, $D'/d$ is 5.5, $D''/d$ is 11, and $D_o/d$ is 15, resulting in a fiber in which about 3% of the glass is deposited glass, and wherein about 47% of the glass is essentially undoped silica. This substantial fraction of the total volume (desirably more than about five times the volume of core material) serves as a load-bearing region during fiber drawing, making possible lower draw temperature and/or higher draw speed.

Figure 6:
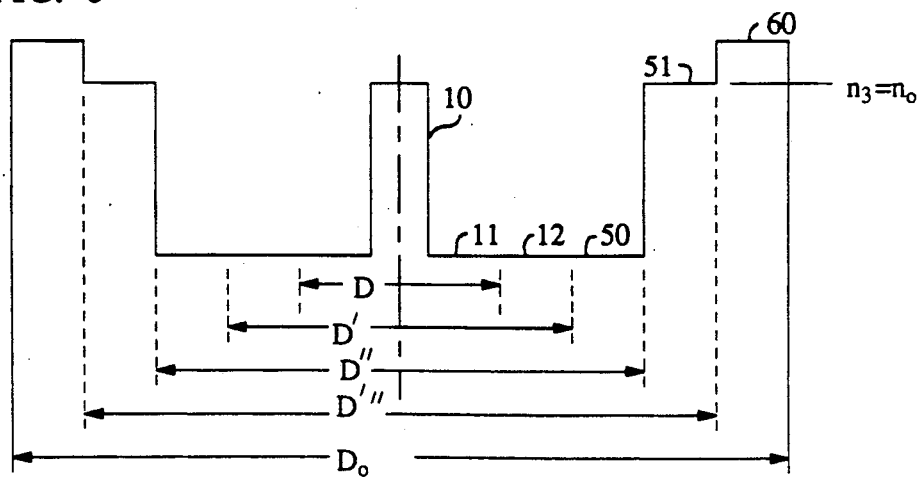

A still further exemplary embodiment of the invention is shown in FIG. 6, wherein cladding region 51 is surrounded by a further doped cladding region 60, exemplarily having a refractive index $\geq n_o$, and having viscosity lower than that of silica. Exemplarily, region 60 is phosphorous or boron doped. Region 50 is optional. The presence of a doped outermost cladding layer can result in increased proof test yield, due to the crack healing ability of relatively low viscosity doped silica.

EXAMPLE 1

An optical fiber having a refractive index profile of the type shown in FIG. 3 was produced as follows. A F-doped silica tube (refractive index $n_2$, where $(n_o - n_2)/n_o = 0.1\%$, outside diameter 25 mm, inside diameter 21 mm) was mounted in standard MCVD deposition apparatus, and a multiplicity of layers of F-doped silica layers deposited, followed by a further multiplicity of lightly Ge-doped silica layers. The F-doping level was chosen to result in a refractive index ($n_1$) substantially equal to that of the substrate tube ($n_2$), and the numbers of F-doped and Ge-doped silica layers were chosen to result in $D/d$ of about 3.3. After completion of the deposition the tube was collapsed into a rod of about 15 mm diameter. Both deposition and collapse were by conventional techniques well known in the optical fiber art. Subsequently the outside of the rod was fire polished, the rod was inserted into a (not intentionally doped) silica tube of 40 mm outside diameter and 17 mm inside diameter, and the tube shrunk onto the rod by a conventional technique. From the thus produced optical fiber preform substantially more than 50 km of single mode optical fiber were drawn at a speed greater than 5 m/sec. The fiber had a diameter of 125 $\mu$m, $D_o/d$ of 15, $D'/d$ of 6, and $D/d$ of 3.3, and had a macrobending loss that did not significantly differ from that of a commercially available fiber that has $D/d$ of about 5.5, and which has essentially the same value of $\Delta n$ as the inventive fiber.

EXAMPLE 2

An optical fiber having an index profile substantially as shown in FIG. 5 is produced substantially as described in Example 1, except that, after collapse of the substrate tube, a down-doped silica tube (corresponding to region 50; the tube having $n'_2 \sim n_2$, outside diameter 36 mm, inside diameter 19 mm) is shrunk over the rod, and a further silica tube (not intentionally doped, diameters 49 by 37 mm) is shrunk thereon. Fiber is drawn from the thus produced preform at a draw temperature of about 2200° C. at a speed that is higher than that which could be used to draw fiber from a preform that differs from the instant preform only in that $n_3 = n'_2$. The fiber has $D/d$ of 2.7, $D'/d$ of 5.5, $D''/d$ of 11, and $D_o/d$ of 15.

EXAMPLE 3

An optical fiber having an index profile substantially as shown in FIG. 6 is produced substantially as described in Example 2, except that a P-doped silica tube (corresponding to region 60) is shrunk over the pure silica region 51. The resulting fiber has high proof-test yield, due at least in part to the crack healing ability of doped region 60.

We claim:

1. Method of producing an optical fiber, the method comprising
   a) making a rod-like silica-based body comprising
      i) an inner portion of diameter D that consist essentially of silica-based glass produced in situ by means of a glass-forming reaction and that comprises a core region having an effective refractive index ($n_c$) and an effective diameter d, and that further comprises a first cladding region that contactingly surrounds the core region and has an effective refractive index $n_1$, with $n_1 < n_o$ and $n_c$, where $n_o$ is the refractive index of pure vitreous silica; and further comprising
      ii) a second cladding region, of outer diameter D' and having a refractive index $n_2 < n_o$, that contactingly surrounds the inner portion and consists essentially of pre-existing silica-based glass; and
   b) drawing optical fiber from the body;
characterized in that the method further comprises
   c) overcladding, prior to b), the body with pre-existing silica-based glass, the overcladding contactingly surrounding the body and having an outer diameter $D_o$, the overcladding comprising a third cladding region having a refractive index $n_3$, with $n_2 \lesssim n_3 \lesssim n_o$.

2. Method of claim 1, wherein D/d is less than 5.

3. Method of claim 2, wherein $n_3 \approx n_o$, wherein the crosssectional area of the third cladding region is at least 5 times that of the core region, and wherein $n_c \approx n_o$.

4. Method of claim 3, wherein the overcladding comprises a fourth cladding region comprising doped silica having a viscosity that is less than that of pure silica, the fourth cladding region being the outermost region of the body.

5. Silica-based optical fiber comprising a central region (the "core") having an effective diameter d and an effective refractive index $n_c$; a first cladding region contactingly surrounding the core and having an effective outer diameter D and an effective refractive index $n_1$; a second cladding contactingly surrounding the first cladding and having an outer diameter D' and a refractive index $n_2$; wherein $n_c > n_1$, $n_2$; $n_c \gtrsim n_o$, wherein $n_o$ is the refractive index of vitreous silica; $n_o > n_1$, $n_2$; and $n_1$ is substantially equal to $n_2$;

wherein the core and the first cladding region consist essentially of glass formed in situ by means of a glass-forming reaction, and wherein the second cladding region consist essentially of pre-existing glass;

CHARACTERIZED IN THAT the fiber further comprises an overcladding region contactingly surrounding the second cladding region, having an outer diameter $D_o$, consisting substantially of pre-existing glass and comprising a third cladding region having a refractive index $n_3$, where $n_2 \lesssim n_3 \lesssim n_o$, and wherein D/d is less than 5.0.

6. Optical fiber of claim 5, wherein the fiber comprises an index trench having a refractive index $n_t < n_1$ and an inner diameter that is greater than or equal to d.

7. Optical fiber of claim 5, wherein $n_3$ is essentially equal to $n_o$, and wherein the cross sectional area of the third cladding region is at least five times that of the core.

8. Optical fiber of claim 7, further comprising a fourth cladding region that consists substantially of doped silica having a viscosity less than that of pure vitreous silica, the fourth cladding region being the outermost region of the fiber.

9. Silica-based optical fiber comprising
   a) a central region (the "core") having an effective diameter d and an effective refractive index $n_c$, and a first cladding region contactingly surrounding the core and having an effective outer diameter D and an effective refractive index $n_1$, the core material and first cladding material produced by an inside deposition process;
   b) a second cladding contactingly surrounding the first cladding and having an outer diameter D' and a refractive index $n_2$, the second cladding material derived from a substrate tube;
   c) an overcladding contactingly surrounding the second cladding and having an outer diameter $D_o$, the overcladding derived from one or more overcladding tubes, with the normalized refractive index difference between $n_2$ and the refractive index of at least one of the overcladding tubes being at least about 0.04% in magnitude; and
   d) D/d is less than 5.

10. Optical fiber of claim 9, wherein the overcladding derived from one or more overcladding tubes comprises a third region having a refractive index $n_3$, and the refractive indices are selected such that $n_c > n_1$, $n_2$; $n_c \gtrsim n_o$; $n_o > n_1$, $n_2$; $n_1 \sim n_2$; $n_3 \lesssim n_o$; $(n_3 - n_2)/n_2 > 0.04\%$; where $n_o$ is the refractive index of vitreous silica.

11. The optical fiber of claim 9, wherein the substrate tube is a fluorine-doped substrate tube.

* * * * *